United States Patent [19]
Hundebøl

[11] Patent Number: 5,975,891
[45] Date of Patent: Nov. 2, 1999

[54] METHOD FOR REDUCING $NO_x$ EMISSION FROM A KILN PLANT

[75] Inventor: Søren Hundebøl, Valby, Denmark

[73] Assignee: F. L. Smidth & Co., A/S, Denmark

[21] Appl. No.: 09/128,792

[22] Filed: Aug. 4, 1998

Related U.S. Application Data

[63] Continuation of application No. PCT/DK97/00029, Jan. 22, 1997.

[30] Foreign Application Priority Data

Feb. 14, 1996 [DK] Denmark ................................. 0150/96

[51] Int. Cl.$^6$ ....................................................... F27B 15/00
[52] U.S. Cl. ................................ 432/14; 432/58; 432/106
[58] Field of Search .................................. 432/105, 106, 432/58, 15, 14

[56] References Cited

FOREIGN PATENT DOCUMENTS

| | | |
|---|---|---|
| 0103423 | 3/1984 | European Pat. Off. . |
| 0526770 | 2/1993 | European Pat. Off. . |
| 3426296 | 1/1986 | Germany . |
| 3100661 | 11/1989 | Germany . |
| 3522883 | 5/1993 | Germany . |

OTHER PUBLICATIONS

Research Disclosure, RD314087, Jun. 10, 1990, "Plant for manufacturing of cement clinker", disclosed anonymously.

*Primary Examiner*—Tu Ba Hoang
*Assistant Examiner*—Jiping Lu
*Attorney, Agent, or Firm*—Baker & Botts, L.L.P.

[57] ABSTRACT

There is disclosed a method for reducing the NOx emission from a kiln plant for heat treatment of raw materials, in which kiln plant fuel can be fired in at least three zones an amount c of fuel is burned, in a second of these zones an amount b of fuel is burned and to this second zone the NO containing exhaust gases from the other at least two zones are also fed. In the rest of these at least three zones an amount a of fuel is burned and at least a part of the raw materials are fed to these zones together with an oxygen containing gas. The total amount of fuel, b+a, burned in the second and in the last zones is determined by the need for treatment of the raw materials. When the kiln plant is used for manufacturing cement clinker the heat treatment consists of preheating, calcining, sintering and cooling of the mineral raw materials.

9 Claims, 3 Drawing Sheets

METHOD FOR REDUCING $NO_x$ EMISSION FROM A KILN PLANT

This is a continuation of copending Ser. No. PCT/DK97/00029 filed Jan. 22, 1997.

BACKGROUND OF THE INVENTION

The invention relates to a method for reducing the $NO_x$ emission from a kiln plant where low volatile fuels are used for heat treatment of raw materials, in which kiln plant fuel can be fired in at least three different zones. In one of these at least three zones an amount c of fuel is burned, in a second of these zones an amount b of fuel is burned and to these second zone the NO containing exhaust gases from the other at least two zones are also fed. In the rest of these at least three zones an amount a of fuel is burned and at least a part of the raw materials are fed to these zones together with an oxygen containing gas. The total amount of fuel, b+a, burned in the second and in the last zones is determined by the need for treatment of the raw materials and the amounts of fuel, b and a, burned in the second (2) and the last zones, are adjusted in upward and downward direction until a minimum NO content is achieved in the exhaust gases from the second zone.

Nitrogen oxides, $NO_x$, are formed during combustion due to oxidation of nitrogen in the fuel and due to oxidation of nitrogen in the combustion air. In case the temperature in the combustion zone is less than 1200° C., $NO_x$ is formed only on the basis of the nitrogen which is present in the fuel. This type is called fuel $NO_x$. If the temperature rises to a level beyond 1200° C., nitrogen oxides will also be formed on the basis of the combustion air. This type is called thermal $NO_x$. Approximately 95% of the nitrogen oxides which are formed as fuel $NO_x$ and thermal $NO_x$ consist of nitrogen oxide, NO. In a system in which fuel containing nitrogen is burned, the following types of reactions can take place:

(1) $N_{fuel}+O \rightarrow NO$ 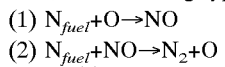

(2) $N_{fuel}+NO \rightarrow N_2+O$

Reaction (1) indicates that the NO formation in the zone will depend on the content of nitrogen in the fuel and on the oxygen content of the gases in that zone. Reaction (2) indicates that if NO is already present in the gas which is fed to this zone, the amount of NO present in the supplied gas will be reduced by means of the nitrogen compounds which are released from the fuel. The net production of NO thus also depends on the NO content in the supplied gas and as the reaction rate of reaction (2) rises more quickly with the temperature than the reaction rate for reaction (1), an increase of the temperature will in net terms lead to a reduction of the amount of $NO_x$ which is emitted from the calcining zone. In connection with high temperature combustion in the calciner it is known that if the temperature is increased by approximately 100° C., it is possible to lower the $NO_x$ from the calciner by 10–15%. The upper limit of this advantage is 1200° C., at this temperature the forming of thermal $NO_x$ from the combustion air will exceed the reduction of NO by reaction (2).

When the kiln plant is used for manufacturing cement clinker the heat treatment consists of preheating, calcining sintering and cooling of the mineral raw materials. The three zones where the N-containing fuel is burned are in the sintering zone, in a kiln, and at two locations in the calcining zone, in a calciner and in at least one burning compartment. According to the description of this invention a 'burning compartment' is a zone where fuel is fired and where at the same time materials to be treated are added. A 'calciner' is a burning compartment located in the kiln gas duct where the exhaust gases from the kiln will pass through it.

The temperature in a kiln plant for cement clinker manufacture is only in excess of 1200° C. in the sintering kiln itself. The necessary temperature and time of retention in the kiln depend on the characteristics of the raw materials. A raw material with poor burning characteristics will thus require a high temperature and/or prolonged time of retention. Such conditions with a high flame temperature up to 2000° C. will increase the rate of $NO_x$ emission substantially.

Measurements have indicated that the content of volatiles in the used fuel and the temperature at which calcination is taking place are factors which influence the formation of $NO_x$ in the calcining zone. The higher the content of volatiles in the fuel, the smaller it appears is the amount of $N_{fuel}$ which is transformed into $NO_x$.

It is a recognised fact that various advantages may be obtained by constructing a calcination zone equipped with an additional burning compartment which is located in such a way that the burning compartment is exclusively fed with tertiary air from the cooler. Such a burning compartment would be considered to be included in the calcination zone if raw materials were added to the compartment.

A plant of this type is described in European patent No. 103423 (F. L. Smidth & Co. A/S, corresponds to DK-C-151319). Here from is known a plant (SLC-S) for calcination of cement raw materials, in which it has been taken into account that it may be difficult to achieve a complete burn-out of the fuel which is used in the calciner. In this plant raw meal is fed after it has passed through la cyclone preheater (18, 18', 19, 20, 21), to a burning compartment (4) in which the raw material is calcined in hot air from the cooler (2). Subsequent to preheating, raw meal is directed to the calcining zone at two locations: in the burning compartment (4) and in the kiln gas duct (28) or the retention compartment (29). As indicated in claim 4 it is possible to feed fuel to the kiln gas duct (28) via a burner (45), but according to column 6, line 13–27, this supplementary fuel is supplied in order to ensure that the amount of raw meal in the kiln gas duct can be increased.

From U.S. Pat. No. 4,014,641 (Mitsubishi) is known a plant for calcination of cement raw materials in which the amount of nitrogen oxide in the exhaust gases of the kiln is reduced by generating an area in the kiln gas duct to which reducing gas is fed. Hot air from the cooler (via a duct (5)) and hot air from the kiln (via a duct (13)) are routed to a cyclone preheater (14, 15, 16, 17) in which raw material is preheated in counter-current to the hot gas from the cooler and from the kiln. In the area of the kiln gas duct which is located below the supply duct (5) from the cooler, reducing conditions are generated by introducing reducing gases via a duct (12). The reducing gases are formed in the calciner (8) as the air volume which is being fed to the calciner is sufficient to cause gasification of the fuel in the calciner, but insufficient to cause a complete burn-out of the fuel in the calciner (column 4, line 1–5). A particular disadvantage of this plant is that fuels that are difficult to ignite and slow burning, such as petroleum coke, anthracite and other coals with a low gas content cannot be used, as they would produce a large unburned coke residue which would be precipitated in the rotary kiln, and, as a consequence hereof, would be causing problems in terms of sulphur expulsion and caking.

From U.S. Pat. No. 5,364,265 (CLE) is known yet another calcining system in which the $NO_x$ emission is limited by formation of reducing gases, viz. CO and $H_2$, in a burning compartment (20). The coke formed in the burning compartment during this process has quite distinctive reactive properties. However, optimisation of this method is relatively difficult in regard to ensuring minimum $NO_x$ emission since only a few parameters can be adjusted during operation. The amount of fuel burned in the burning compartment depends entirely on the desired degree of calcination of the raw meal.

SUMMARY OF THE INVENTION

The invention seeks to provide a method by means of which a reduced $NO_x$ emission from a kiln plant is obtained, allowing, at the same time, utilisation of fuels of low reactivity, such as petroleum coke, anthracite and other coals with a low gas content, in zones at a relatively low temperature. When producing cement clinker zones at a relatively low temperature is found in the calcining unit(s) before the raw meal enters the kiln.

In accordance with the invention this object is accomplished in that the amount of fuel b, which is used for firing in a zone to which the NO containing exhaust gases are fed and the amount of fuel a, which is used for firing in the zone to which raw materials and oxygen containing gas are fed, respectively, are adjusted in upward and downward direction until a minimum NO content is achieved in the exhaust gases from the zone to which the NO containing exhaust gases from all other firing zones are fed. The temperature in the zones where the fuel b and a are burned are between 900–1200° C.

Actually this method, with combustion of fuel in a burning compartment located in the tertiary air duct and in a calciner which is a burning compartment located in the kiln gas duct, is a combination of an ILC-plant (In-Line-Calciner) and an SLC-S-plant (Separate-Line-Calciner-Single preheater string). Therefore, it would be reasonable to assume that the $NO_x$ emission from such a combination plant would be a mean value between the $NO_x$ emission coming from an ILC-plant and that coming from an SLC-S-plant of equivalent capacity. Quite surprisingly, it has, however, turned out that the $NO_x$ emission from a plant which is operated according to the method as per claim 1 is lower than that achievable in any of the two traditional plants, ILC and SLC-S. Also, it is quite uncomplicated to convert any existing ILC plants into a plant which can be operated in accordance with the method as per claim 1, which means that it will be possible to use fuels which are difficult to burn in the calcining zone.

In existing SLC-S plants as described in European patent no. 103423 it is already possible to burn fuel in the kiln gas duct for formation of a reducing zone, and, therefore, the invention can be implemented at these plants without necessitating any major structural modifications of the plant.

Even when a modest amount b of fuel is fired in the kiln gas duct, as around 10% of the total amount of the fuel which is used in the calcining zone, it will be possible to achieve a significant reduction of the $NO_x$ emission from the calcining zone, but a minimum of emitted $NO_x$ from the calcining zone will generally be ascertained when an amount b of fuel of between 25 and 75% is fired in the calciner.

In order minimised the $NO_x$ emission during the cement clinker manufacturing process, it is advantageous that the process in the burning compartment and in the calciner is taking place at a relatively high temperature, since the reaction rate of reaction (2) is increased relative to the reaction rate of reaction (1). Further the burning out of slow burning fuels as petrocoke and anthracite is increased at higher temperatures. The upper limit to operating temperature when the process is utilised for manufacturing of cement is around 1200° C. When the temperature is around 1200° C., a liquid phase formation in the raw meal begins, causing the raw meal to become sticky.

An advantageous way of regulating the temperature in calciner and burning compartment is to feed the raw meal to the calcining zone in a controlled manner. It has thus proved to be particularly advantageous to split the raw meal which is fed to the calcining zone into three substreams. These three sub-streams are then fed before and after/in the calciner, respectively, in addition to the raw meal input to the burning compartment. In connection with this split-up, the temperature is set for 1000–1150° in that part of the calcining zone which follows immediately after the mixture of exhaust gases from the kiln, of exhaust gases and partially calcined raw materials from the burning compartment and of calciner fuel, but before adding the remaining raw materials. This temperature zone provides for a favourable decomposition of $NO_x$, also when using difficult-to-burn fuel, such as petroleum coke and anthracite.

BRIEF DESCRIPTION OF THE DRAWING

The invention will now be described in further details with reference to the figures, where.

DESCRIPTION OF THE PREFERRED EMBODIMENTS

Figure 1:
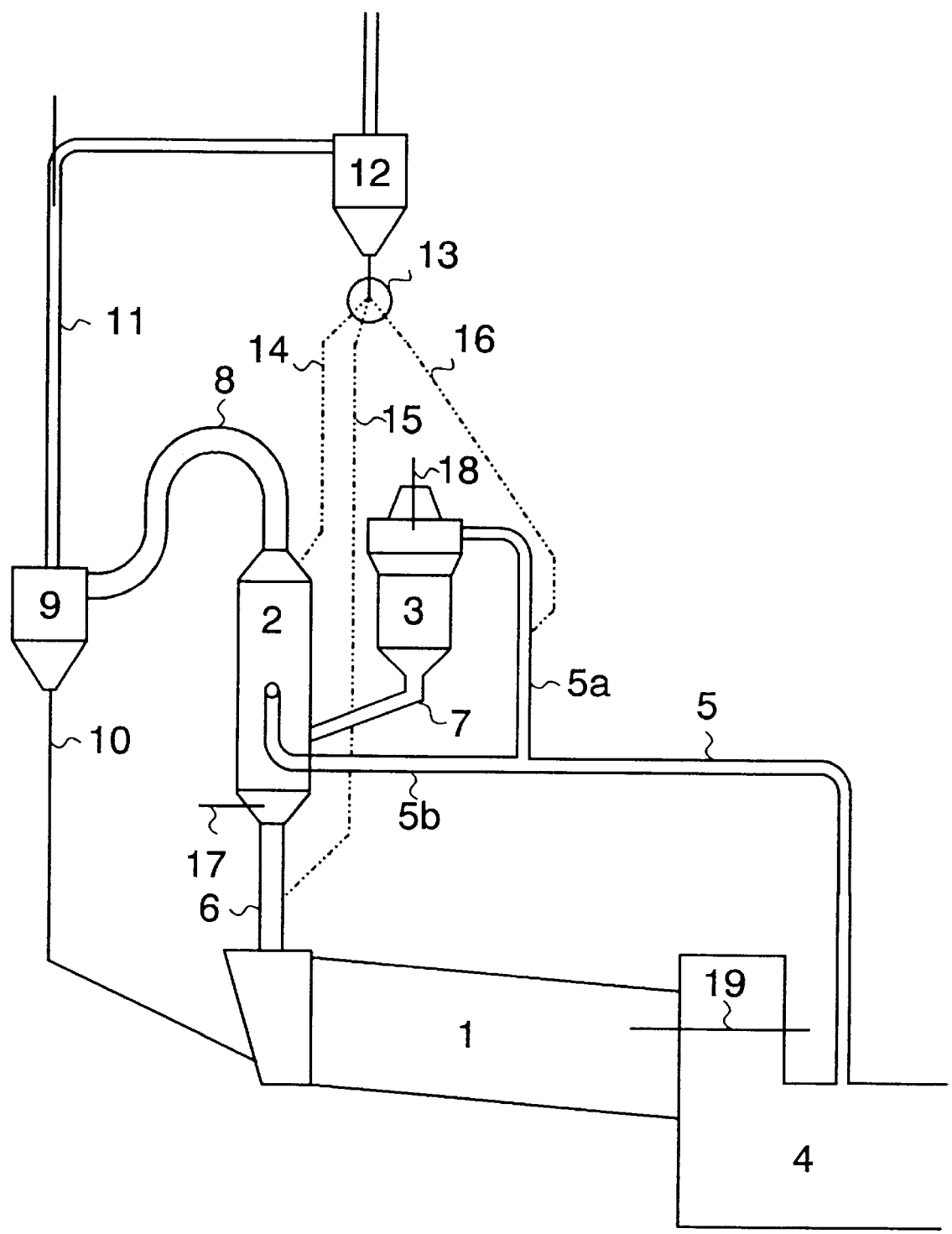
FIG. 1 shows an example of a plant by means of which the method according to the claims can be carried out.

The kiln plant in FIG. 1 is a kiln plant for manufacturing of cement clinker. It comprises a kiln 1, a calciner 2 and a burning compartment 3. After the kiln 1 there is a clinker cooler 4, from which hot air is carried via a duct 5 to the calcining zone. The hot air is split between two ducts 5a and 5b which leads the air to the calciner 2 and the burning compartment 3. The calciner 2 is fed with hot exhaust gases from the kiln 1 via the duct 6 and hot exhaust gases mixed with partially calcined material from the burning compartment 3 via a duct 7.

Calcined material is directed from the calciner 2 via a duct 8 in suspension to a separating cyclone 9. In separating cyclone 9 the gas/material suspension is separated into a stream of calcined material and a hot gas stream. The calcined raw material is carried via the duct 10 to the rotary kiln 1 and the hot gas stream is directed via the duct 11 to a suspension preheater with several cyclones. Only the lowermost cyclone 12 in the preheater is illustrated in FIG. 1.

The preheated raw material from the cyclone 12 is directed via a tripartition means 13 down into the calcining zone via three ducts 14, 15 and 16. The duct 14 feeds the raw material to a location after the calciner or into the proper calciner 2, the duct 15 feeds raw material into the exhaust gases from the kiln 1 so that the raw meal is directed into the calciner and the duct 16 feeds the raw material into the burning compartment 3. The duct 16 may either direct the material directly into the burning compartment 3 or to the tertiary air duct 5, the latter is shown on FIG. 1.

The total raw material stream is continuously distributed in controlled manner between the three ducts 14, 15 and 16, and, under special circumstances, one may, for example, choose to interrupt the flow of material through one or several of the ducts 14, 15 and 16.

In this plant fuel may be fired in the calciner 2 by means of a burner 17 (b kcal/kg clinker), in the burning compartment 3 by means of a burner 18 (a kcal/kg clinker) and in the kiln 1 by means of a burner 19 (c kcal/kg clinker).

Figure 2:
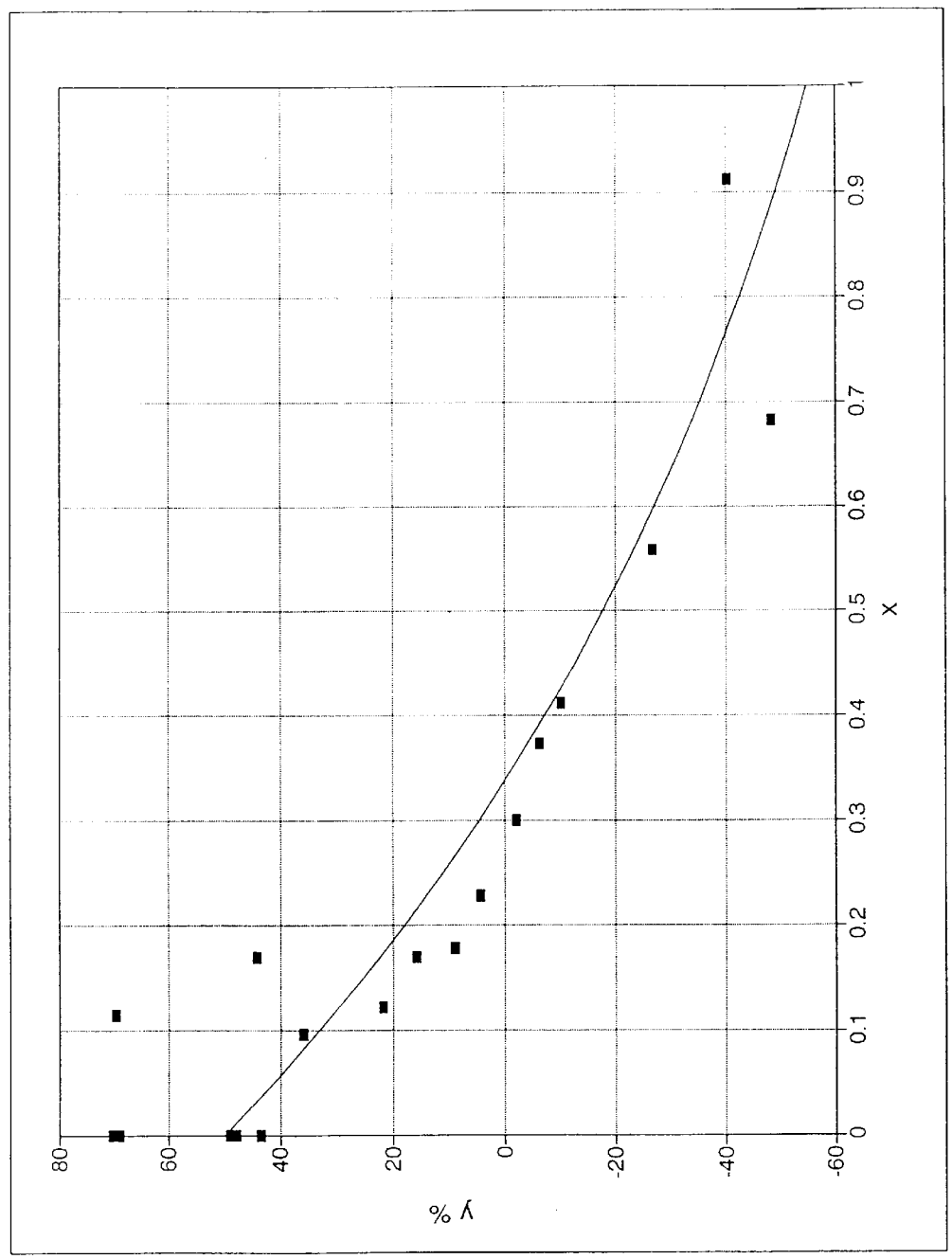
FIG. 2 shows the $NO_x$ emission from a number of ILC plants as a function of the amount of $NO_x$ input to the calciner.

FIG. 2 indicates recorded data for the NO production in a number of ILC calciners as a function of the amount of NO which is fed to the calciner from the kiln. Since the data relate to measurements from many different plants at which firing is carried out with different fuels exhibiting variations in terms of calorific value and nitrogen content, a non-dimensional illustration has been chosen, where $$x = \frac{NO_{IN}}{N_{fuel}}$$

$$y = \frac{NO_{OUT} - NO_{IN}}{N_{fuel}}$$

= the conversion ratio of $N_{fuel}$ into $NO$.

and $NO_{IN}$, $NO_{OUT}$ and $N_{fuel}$ have been calculated as kmol/h or kg N-equivalents/kg clinker.

If a curve is adapted to the experimental data, the following relation emerges:

$$y = 1.5 \cdot \exp(-x) - 1$$

If it is possible to choose the size of x, x should be chosen so that y<0, which means that the amount of $NO_x$ discharged from the calciner is smaller than that supplied to the calciner. If firing can be carried out at three locations in kiln plant as described in claim 1, it will be possible to choose such an x-value.

Figure 3:
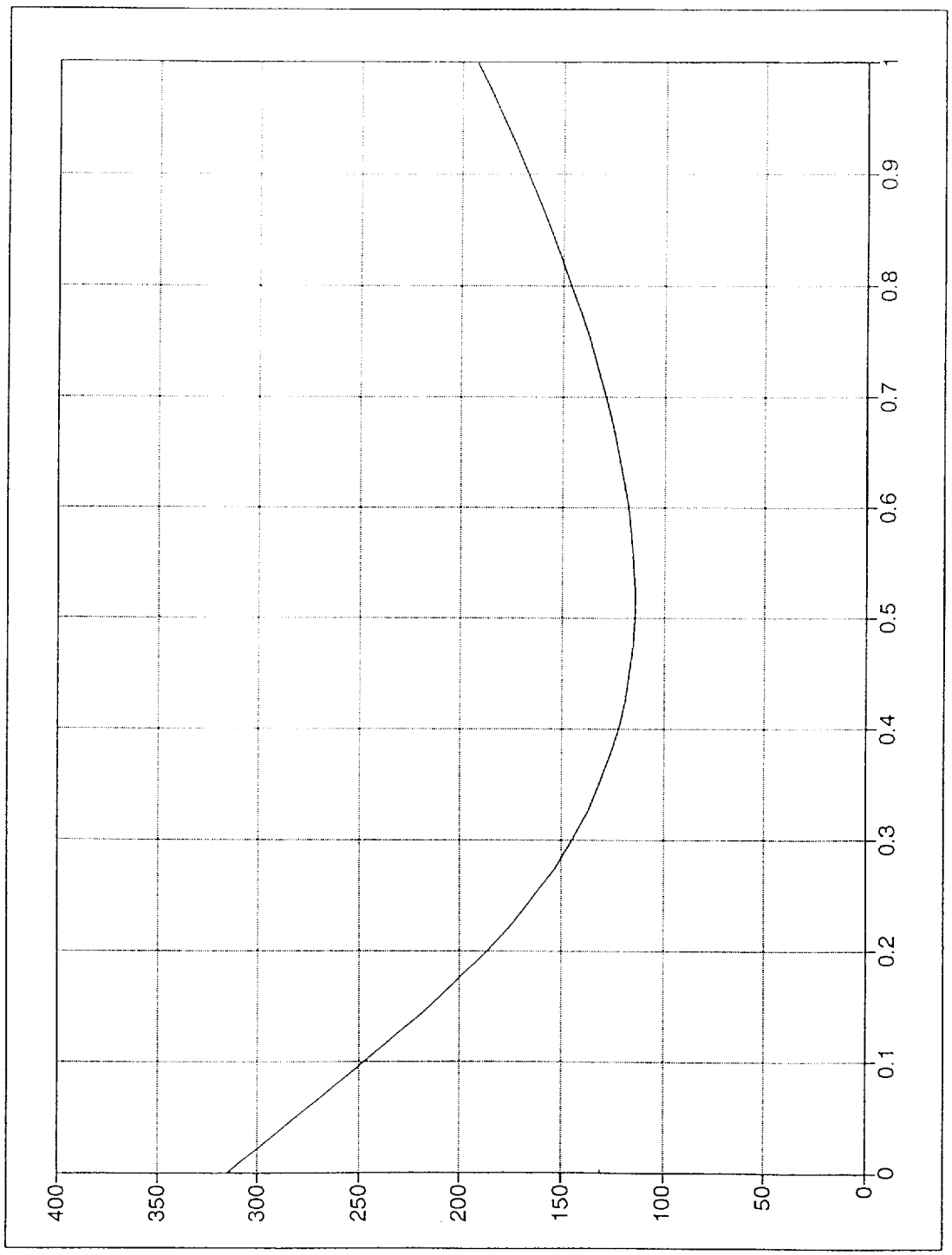
FIG. 3 shows the $NO_x$ emission from the calciner as a function of the amount of fuel added to the calciner in relation to the total amount of fuel added to the calcining zone.

When an example of a computation using the above form for y is made for a plant in which fuel can be fired in the calciner as well as in a burning compartment, the curve in FIG. 3 emerges.

In this example a total amount of 750 kcal/kg clinker is fired in the kiln plant and of this c=300 kcal/kg clinker is fired in the rotary kiln. If petroleum coke is used as fuel in the rotary kiln the conversion ratio of $N_{fuel}$ into NO would be relatively low due to the fact that the flame temperature of petroleum coke is not particularly high, and, therefore, the amount of thermal $NO_x$ produced will be quite small, while, at the same time, the temperature in the kiln at around 1400° C. is sufficiently high to make reaction (2) dominant. As a consequence hereof, the conversion ratio for the kiln is set to be $y_{kiln}=0.3$ which is typical for rotary kilns fired with petroleum coke.

In the calcining zone firing is taking place with a+b=450 kcal/kg clinker, which is distributed with b kcal/kg clinker in the calciner and 450-b kcal/kg clinker in the burning compartment. If the temperature in the burning compartment is maintained at around 1100° C., the conversion ratio in the burning compartment will typically be of the order $y_{burn}=0.5$ when firing with petroleum coke.

The following formulae apply to the calciner:

$$y_{kalc} = \frac{NO_{OUT,calc} - NO_{IN,calc}}{N_{fuelc,alcc}} \Rightarrow N_{fuel,calc} \cdot y_{calc} =$$

-continued $$NO_{OUT,calc} - NO_{IN,calc} \Rightarrow N_{OUT,calc} =$$

$$N_{fuel,calc} \cdot y_{calc} + NO_{IN,calc} \Rightarrow NO_{OUT,calc} =$$

$$N_{fuel,calc} \cdot y_{calc} + (NO_{kiln} + NO_{burn}) =$$

$$N_{fuel,calc} \cdot y_{calc} + (N_{fuel,kiln} \cdot y_{kiln} + N_{fuel,burn} \cdot y_{burn})$$

The emission, $NO_{out,calc}$, is depicted in FIG. 3 as a function of b/a+b:

$$NO_{OUT,calc} = b \cdot y_{calc} + N_{fuel,kiln} \cdot y_{kiln} + N_{fuel,kiln} \cdot y_{burn} =$$

$$b \cdot \left(1.5 \cdot \exp\left(-\frac{NO_{IN,calc}}{N_{fuel,calc}}\right) - 1\right) + N_{fuel,kiln} \cdot y_{kiln} + N_{fuel,burn} \cdot y_{burn} =$$

$$b \cdot \left(1.5 \cdot \exp\left(-\frac{300 \cdot 0.3 + (450-b) \cdot 0.5}{b}\right) - 1\right) +$$

$$300 \cdot 0.3 + (450-b) \cdot 0.5$$

If b/a+b=0, the plant is used as an SLC-S plant, in which case the $NO_x$ is at an absolute maximum level. If b/a+b=1 then a=0 and the plant is used as an ILC plant.

As is apparent from FIG. 3, there is a minimum limit to the $NO_x$ emission for b/a+b≈0.5.

The minimum limit depends essentially on the amount of $NO_x$ being produced by the kiln. The higher the input of $NO_x$ from the kiln to the calciner, the lower the amount a of fuel fired in the burning compartment should be.

I claim:

1. A method for reducing the $NO_x$ emissions from a kiln plant for treatment of raw material, said kiln plant having a preheater and three zones, with a first duct for feeding exhaust gas from said first zone to said second zone, and a second duct for feeding exhaust gases from said third zone to said second zone, said method comprising the steps of in the first zone feeding an oxygen containing gas and burning an amount of c of fuel, in the second zone burning an amount b of fuel and feeding to said second zone NO-containing exhaust gases from said first zone via said first duct and exhaust gases from said third zone via said second duct, removing the exhaust gases from the second zone from the plant, in the third zone burning an amount a of fuel and feeding oxygen-containing gas, to said third zone, feeding raw material to the first zone, determining the total amount fuel, b+a, which is burned in the second and third zones by the energy requirement for obtaining a desired degree of heat treatment of the raw material fed to the first zone, adjusting the ratio of b to a to obtain minimum NO content in the exhaust gases from the second zone, splitting raw material from the preheater into three streams so as to regulate the temperature in the second zone and the third zone within the range 900–1200° C., feeding the first stream to the exhaust gases flowing from the first zone to the second zone via the first duct, feeding the second stream to the third zone, and passing a flow of material through the second zone downstream to a duct that supplies partially calcined material from the third stream to said flow.

2. A method according to claim 1, including feeding the third stream to a location after the second zone.

3. A method according to claim 1 or 2, wherein the first zone is a kiln, the second zone is a calciner, and the third zone is at least one burning compartment having a top part and a bottom part.

4. A method according to claim 3, including feeding the raw materials and oxygen-containing gas into the top part of the burning compartment(s), and firing the fuel into the top part of the burning compartment(s), and extracting at least partially calcined material and exhaust gases from the bottom of the burning compartment(s).

5. A method according to claim 2, wherein the temperature in the calciner is within the range 900–1150° C.

6. A method according to claim 5, wherein the temperature is within the range 950–1150° C.

7. A method according to claim 6, wherein the temperature is within the range 1000–1150° C.

8. A method according to claim 3, wherein the temperature in the burning compartment(s) is within the range 900–1200° C.

9. A method according to claim 8, wherein the temperature is in the range 1050–1200° C.

* * * * *